(No Model.)
N. R. WICKERSHAM & H. A. JAMISON.
BICYCLE OR OTHER VEHICLE PUMP.
No. 596,223. Patented Dec. 28, 1897.
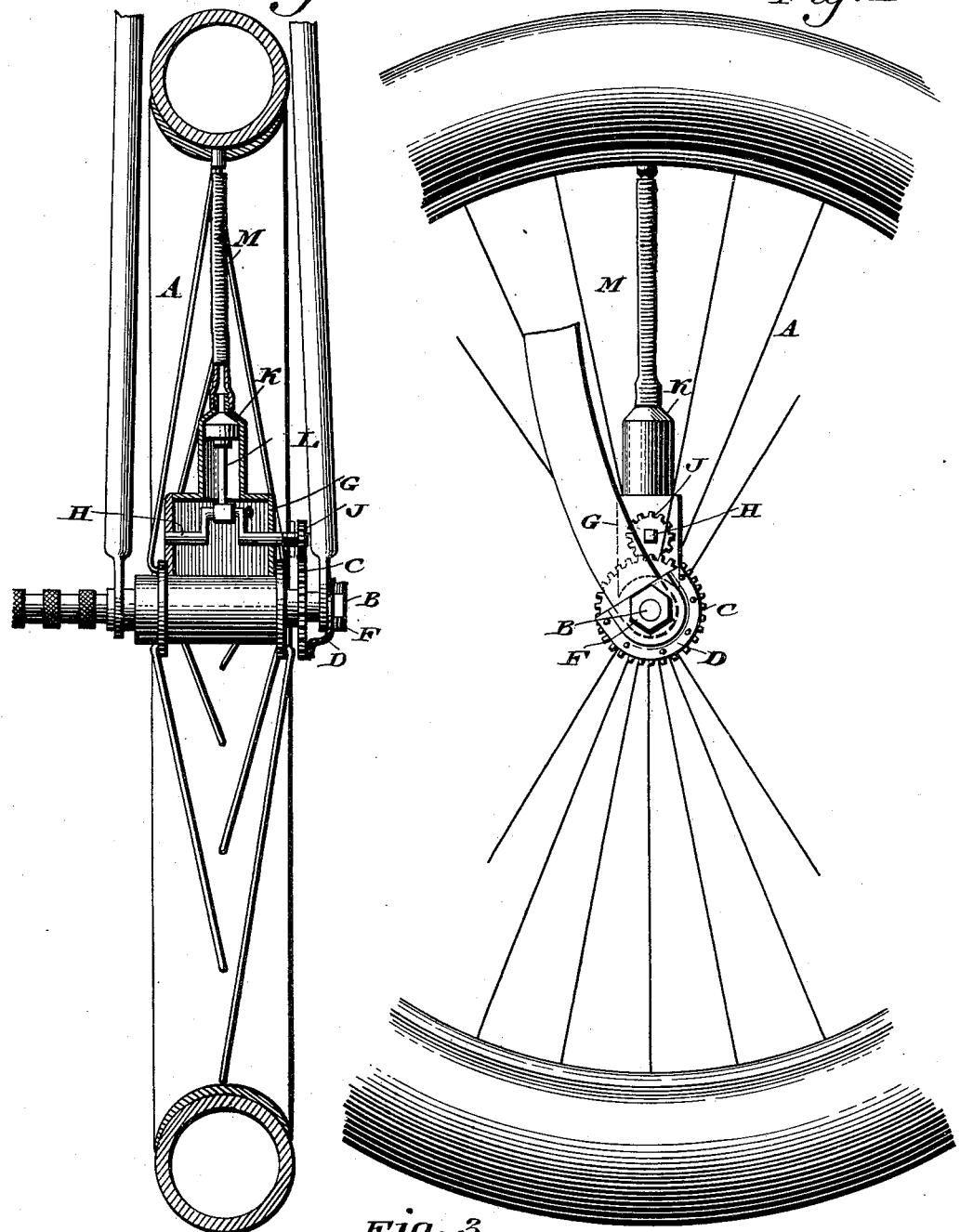
WITNESSES
P. F. Aagle.
L. Donville.
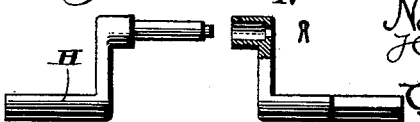
INVENTORS.
Nathan R. Wickersham
Harry A. Jamison
BY
Wickersham + Fairbanks
ATTORNEYS.

UNITED STATES PATENT OFFICE.

NATHAN R. WICKERSHAM AND HARRY A. JAMISON, OF PHILADELPHIA, PENNSYLVANIA.

BICYCLE OR OTHER VEHICLE PUMP.

SPECIFICATION forming part of Letters Patent No. 596,223, dated December 28, 1897.

Application filed July 9, 1897. Serial No. 643,955. (No model.)

*To all whom it may concern:*

Be it known that we, NATHAN R. WICKERSHAM and HARRY A. JAMISON, citizens of the United States, residing in the city and county of Philadelphia, State of Pennsylvania, have invented a new and useful Improvement in Bicycle or other Vehicle Pumps, which improvement is fully set forth in the following specification and accompanying drawings.

Our invention consists in providing a bicycle or other vehicle with a pump for inflating the tire thereof, the same being operated by the rotation of one of the vehicle-wheels through intermediate gearing, as will be hereinafter described.

It also consists in adapting the gearing to render the pump inoperative.

It also consists of a novel means for mounting the stationary member of the gear employed on one of the shafts of the vehicle-wheel or adjacent portion of the frame.

Figure 1 represents a side elevation of a bicycle-pump embodying our invention. Fig. 2 represents a vertical section thereof. Fig. 3 represents an elevation of the crank-shaft employed, the parts thereof being separated.

Similar letters of reference indicate corresponding parts in the figures.

Referring to the drawings, A designates one of the wheels of a bicycle, and B designates the shaft or axle thereof. C designates a gear or toothed wheel, which freely encircles said shaft B or the hub of the wheel and is rigidly or immovably held in position by means of the bracket D, one end of which is riveted or otherwise secured to the side of said gear-wheel and the other end is fitted on the shaft B and clamped to the adjacent portion of the frame E of the bicycle by means of the nut F on said axle. Secured to the hub of the wheel is the box G, on whose sides is mounted the crank-shaft H, one end of which carries the pinion J, the latter meshing with the gear-wheel C. Secured to said box G is the barrel K of a pump, whose piston-rod L is connected with the wrist of the crank-shaft H, the foot of said barrel having attached to it the pipe or tube M, which is connected with the tire of the bicycle and communicates therewith. The end of the shaft H, which carries the pinion J, is squared or feathered, so that said pinion may be moved on said shaft and thus placed into gear with and out of gear from the wheel C.

The operation is as follows: When it is desired to inflate the tire, the pinion J is moved into engagement with the wheel C. The wheel A of a bicycle is now rotated either by hand or by running the bicycle itself, so that the pinion J is carried around the wheel C, the box G, the pump, and the crank-shaft F following the same, whereby the pinion receives rotation, the motion of which is communicated to the shaft F, causing the operation of the pump-piston and the consequent inflation of the tire. The pinion J is now shifted, so as to be disengaged from the wheel C, and thus the operation of the pump ceases.

Owing to the box G the wrist of the crank-shaft and the connection of the piston-rod therein are guarded or shielded from dirt, water, &c., while the pinion and gear-wheel C, which may be exposed, are convenient of access for purposes of cleansing, repairs, &c.

In order to conveniently locate the crank-shaft H, the same is made in parts or sections and the wrist is formed or connected with one section and passed through a laterally-extending socket in the side arm of the other section, where it is retained in position by a key or nut or other suitable means, as at N, Fig. 3, this feature being also serviceable for the ready disconnection of the piston-rod from said shaft H, in which case the sections of the latter are drawn apart and the journals moved laterally through openings in the side of the box, so that the boss of the piston-rod, which is mounted on the wrist of the crank-shaft, may be detached therefrom and the rod then moved out through an opening in the outer wall of the box G, thus providing for the removal of the pump from the wheel of the bicycle.

The pump may be provided with a safety-valve, so that in case of excess of pressure in the tire said valve may open or blow off, thus relieving the pressure and preventing bursting of the tire.

While we have more particularly described the invention as employed with a bicycle, it is evident that we do not limit ourselves thereto, as it includes all other vehicles having inflated tires.

Having thus described our invention, what we claim as new, and desire to secure by Letters Patent, is—

1. A wheel having a pump connected with the tire thereof for inflating the same, a box on the hub of said wheel, supporting the barrel of said pump, a crank-shaft mounted on the sides of said box and a shifting pinion on said shaft, in combination with a bracket and a gear-wheel which are stationarily mounted on the axle of the wheel, said bracket and gear-wheel being rigidly connected one with the other, said crank-shaft being formed in sections and having means for fastening the latter.

2. A wheel having a pump connected with the tire thereof for inflating the same, in combination with a crank-shaft which has the pump or piston rod attached thereto and a bearing on the hub of said wheel for said shaft, a pinion on journal of said shaft and a stationary gear-wheel carried by the axle, said crank-shaft having its wrist separate from a side arm of said shaft and provided with a fastening device, a journal of said shaft being laterally movable on the bearings and said arm having a laterally-extending socket, movably receiving said wrist.

3. A pump for inflating the tire of a wheel, a crank-shaft, a box forming a bearing for said shaft, the pump or piston rod being mounted on said shaft, a shifting pinion on one of the journals of said shaft, a gear-wheel with which said pinion meshes and a bracket which is firmly secured to said gear-wheel, said bracket and gear-wheel being held stationary on the axle and said crank-shaft formed of separate sections, one of the journals thereof being adapted to move laterally on said box, thus disconnecting said sections.

NATHAN R. WICKERSHAM.
HARRY A. JAMISON.

Witnesses:
JOHN A. WIEDERSHEIM,
WM. C. WIEDERSHEIM.